United States Patent
Joukov et al.

(10) Patent No.: US 8,650,548 B2
(45) Date of Patent: Feb. 11, 2014

(54) METHOD TO DERIVE SOFTWARE USE AND SOFTWARE DATA OBJECT USE CHARACTERISTICS BY ANALYZING ATTRIBUTES OF RELATED FILES

(75) Inventors: Nikolai A. Joukov, Hawthorne, NY (US); Norbert G. Vogl, Hawthorne, NY (US)

(73) Assignee: International Business Machines Corporation, Armonk, NY (US)

(*) Notice: Subject to any disclaimer, the term of this patent is extended or adjusted under 35 U.S.C. 154(b) by 948 days.

(21) Appl. No.: 12/550,023

(22) Filed: Aug. 28, 2009

(65) Prior Publication Data

US 2011/0055816 A1    Mar. 3, 2011

(51) Int. Cl.
    *G06F 9/44*    (2006.01)
(52) U.S. Cl.
    USPC ............................................ 717/130; 717/127
(58) Field of Classification Search
    USPC ................................................. 717/124–133
    See application file for complete search history.

(56) References Cited

U.S. PATENT DOCUMENTS 7,483,959 B2 *   1/2009   Rowland et al. ............... 709/217
2007/0294593 A1 * 12/2007  Haller et al. ................... 714/45

OTHER PUBLICATIONS

Michel et al., "Data Links—Managing Files Using DB2", Dec. 2001, IBM Redbooks, chapters 1-12, pp. 1-234.*

* cited by examiner

*Primary Examiner* — Ted T Vo
(74) *Attorney, Agent, or Firm* — Scully, Scott, Murphy & Presser, P.C.; Louis J. Percello, Esq.

(57) ABSTRACT

A system and method of deriving software use and software data object characteristics determine one or more locations on one or more computer storage devices where one or more configuration and data files associated with computer software components are stored, and obtain one or more attributes associated with said one or more computer software components. One or more commands associated with said one or more computer software components may be issued and one or more related information associated with said one or more software computer components resulting from issuing one or more commands may be collected. The related information and the one or more attributes may be mapped to the computer software components to derive information about the computer software component use and data object use characteristics.

19 Claims, 3 Drawing Sheets

METHOD TO DERIVE SOFTWARE USE AND SOFTWARE DATA OBJECT USE CHARACTERISTICS BY ANALYZING ATTRIBUTES OF RELATED FILES

BACKGROUND

Modern computer systems run various software or programs, for instance, in the background or foreground. However, it is usually not known if a given program is actually being used or not even if it is running. Similarly, if a program is running and servicing requests, it would be desirable to know how frequently requests are being made and when the last such request was made.

Information about software usage is sometimes available in the form of activity logs that keep records for incoming read and update requests, for example, in web and proxy servers. However, logging is disabled on most other production systems such as databases, messaging servers, and application servers. Some middleware systems allow querying their configuration information and some logged data only when such systems are running. However, it is sometimes desirable to query software information without starting the corresponding software services.

BRIEF SUMMARY

A method and system for deriving software use and software data object characteristics are provided. The method, in one aspect, may include, determining one or more locations on one or more computer storage devices where one or more configuration and data files associated with computer software components are stored. The method may also include obtaining one or more attributes associated with said one or more computer software components. The method may further include issuing one or more commands associated with said one or more computer software components. The method may also include collecting one or more related information associated with said one or more software computer components resulting from issuing one or more commands and mapping the one or more attributes and the one or more related information to the computer software components.

A system for deriving software use and software data object characteristics, in one aspect, may include a processor, a storage device, and a module operable to execute on the processor and determine one or more locations on one or more computer storage devices where one or more configuration and data files associated with computer software components are stored. The module may be further operable to obtain one or more attributes associated with said one or more computer software components and issue one or more commands associated with said one or more computer software components. The module may be further operable to collect one or more related information associated with said one or more software computer components resulting from issuing one or more commands and mapping the one or more attributes and the one or more related information to the computer software components.

A program storage device readable by a machine, tangibly embodying a program of instructions executable by the machine to perform methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

Figure 1:
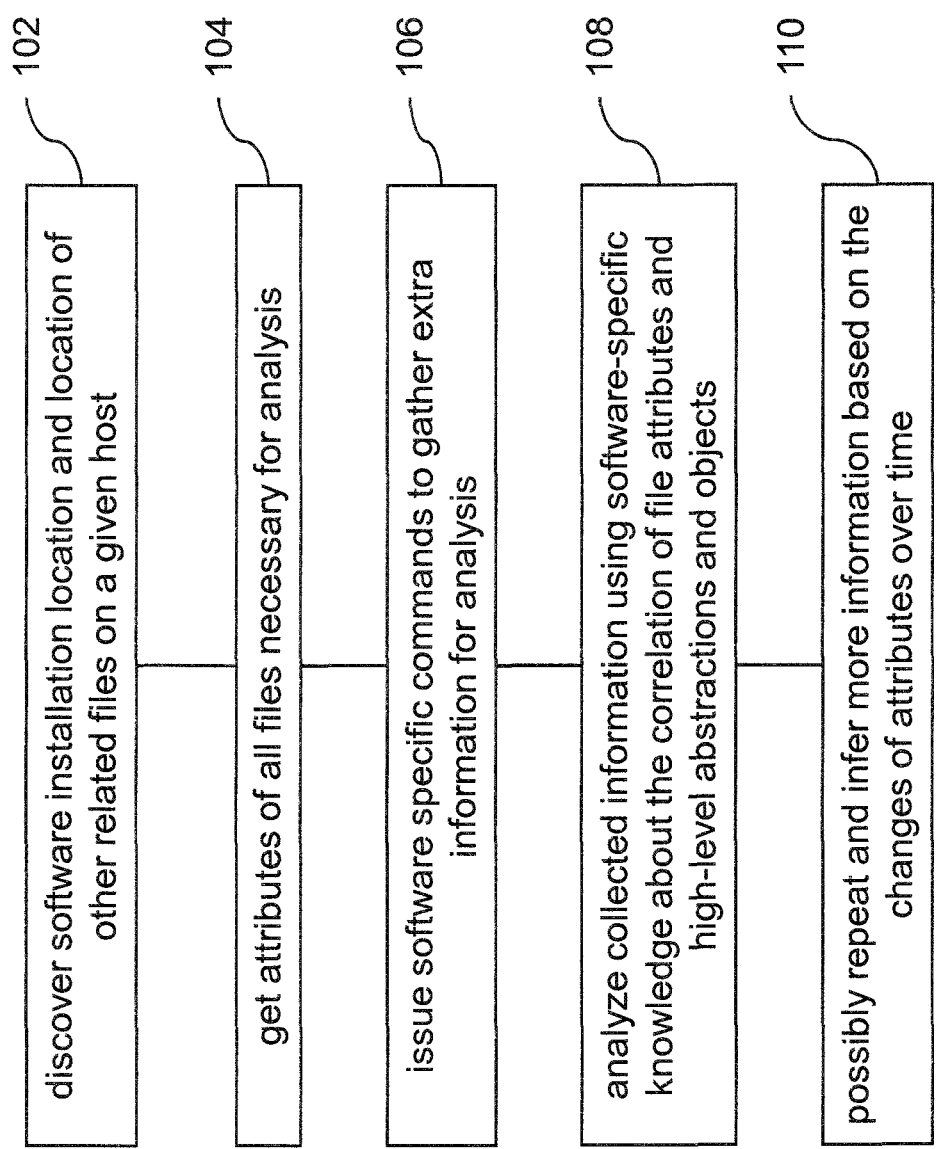
FIG. 1 is a flow diagram illustrating a method of the present disclosure in one embodiment.

The system and method of the present disclosure discover and analyze information about various software components on a computer system and determine usage information. Such usage information may be useful for many IT optimization tasks. For example, a large fraction of servers in data centers are running middleware components that were last used years ago. Such servers can be reused or decommissioned. Similarly, servers under light workloads can be virtualized and many of them can share small amount of resources such as CPUs and memory.

Software components keep data on lower storage devices usually in the form of files. For instance, software components commonly have files associated with a software installation (e.g., executable files), files with configuration parameters (each software installation can frequently use different sets of configuration files sometimes called software instances), log files (usually a set of log files for each instance or for each installation), and data files that contain actual data such as databases or web server content. Files have file system attributes that keep files' last change, modification, and access times and the like. By looking at the attributes of files used by given software installation (whether currently running or not) we infer characteristics of software use at the level of individual data objects such as database tables and messaging queues. This method allows us to observe the last installation, instance, and data update and read times even if the logs for the corresponding software are not available. In turn, this allows us to make high-level decisions about the software use frequency for frequently used servers and identify servers that are not likely being used (e.g., if the last data update happened three years or sometime ago).

Software code, configuration, and data objects are usually stored in files. Data objects can be real data objects such as database tables or messaging queues. They can also be metadata such as files used as locks of shared data objects. For example, IBM DB2 database usually stores each database in a file and IBM WebSphere MQ stores each messaging queue in a file. By looking at the modification time of the corresponding file we can derive the time of the latest write request for the database and by looking at the access time we can infer the time of the last non-cached database read request. This information can be used to analyze use of a given database or the whole database installation.

File access times can also tell when a given software component was last executed with a given set of configuration files. Complex software systems may include multiple components that are executed on demand. For example, IBM WebSphere MQ is frequently configured in such a way that if an external request is received for a given channel, "inetd" daemon starts the listening process. To start the process the daemon reads the corresponding binary and thus updates its access time. When a software component is constantly running and is listening on a port it usually reads or modifies some files while processing requests. Examples of such files may include locks or inter-process communication files such as pipes or files used to share data such as process identification (ID). By looking at the file times, the times of the latest transactions may be captured.

File access, change, and modification times are not the only attributes that can be used to observe software and data entities utilization. For example, the size of the file used to store a messaging queue can be used to analyze per-queue number of outstanding requests buffered in the queue. The size of the file used to store a database can tell the size of the database. Security attributes of a file used to store a database can tell who is authorized to read or write the database.

A method of the present disclosure allows for inferring information without opening files. Further, with the method of the present disclosure, information may be obtained with fewer credentials. For example, computer systems and software provide less privileged users to see attributes of certain files, even thought those users may not have the privileges of reading the files or writing to the files themselves. The method of the present disclosure in one embodiment does not require that a user have the read and/or write privileges, although they can have those privileges.

FIG. 1 is a flow diagram illustrating a method of the present disclosure in one embodiment. At 102, software installation location and location of other related files may be discovered on a given host, e.g., a computer system. It is contemplated that the discovery may span more than one host or computer system, e.g., if the software is installed across multiple computers or platforms, e.g., in a distributed fashion. The discovery may be done by looking at the program signatures in the lists of running processes, by looking at software installation locations, by calling operating system (OS) application program interfaces (APIs) used to register software installations, or by scanning file systems for particular files, or combinations thereof or other methods. Program signatures can be the names or identifiers of the software or one or more processes of the software under analysis. For example, a set of files with particular names in a given directory can be used as a software signature. Also a combination of process name and files located in its directory can be used as a software signature. The discovery step at 102 may be performed by a computer process or function that automatically retrieves and reads the information in the computer system to determine the software installation location and location of other related files. For example, IBM's Galapagos system that allows for model-driven discovery of end-to-end application-storage relationships in distributed systems, and/or Tivoli™ Application Dependency Discovery Manager (TADDM) are examples of systems that may be used to discover software assets, configuration, and data objects.

At 104, attributes of all files necessary for analysis are obtained or retrieved. This may be accomplished by, for example, issuing recursive list ("ls") command on the whole software installation, configuration, and data directories. Other methods may be used to obtain attributes of the files, depending on the computer system being analyzed. An automated computer process or function may automatically retrieve the attribute information.

At 106, configuration files are collected that describe the mapping of data objects such as databases or enterprise applications to files. Instead of configuration files the same information can sometimes be collected by issuing software-specific commands. For example, "db2 list database directory" DB2 command lists the directory for files used by each local database such as this one:

| Database 1 entry: | |
|---|---|
| Database alias = | DB01 |
| Database name = | DB01 |
| Local database directory = | /db2/db8/db |
| Database release level = | a.00 |
| Comment = | |
| Directory entry type = | Indirect |
| Catalog database partition number = | 0 |
| Alternate server hostname = | |
| Alternate server port number = | |

DB2 and other databases have other commands to list tablespaces (directories, files, or whole storage volumes used to keep databases data) and map them to databases. The extra information may pertain to not only the information about the file, but also other components and/or elements that the file interacts with. For example, the program file may have instructions to access a data or table or the like from a database, create or access message queues or the like to process some instructions or data to perform the functionality indicated in the program file, and the like. Thus, for example, databases or database elements such as tables in memory may be listed and mapped to corresponding file names. As another example, messaging queues may be listed and mapped to files or file names. For example, "mqs.ini" file for WebSphere MQ lists configuration directories for each queue manager and queues are usually stored in their subdirectories with each queue name being mapped to each file name. In general, each software component has a way to locate its data files used to store data and such way can be modeled and used to locate such files and map them to software-specific data objects.

At 108, the collected information may be analyzed using software-specific knowledge about the correlation of file attributes and software-specific abstractions and objects. For example, last write time to a file is usually equal (potentially with a small delay) to the last write time to the software-specific object such as a database. Last file read time usually corresponds to the last non-cached read to software-specific objects. However, per-software modeling of such file attributes propagation may be also needed. For example, for some software last write time may correspond to a read operation for software object if a read operation results in some object update. Similarly, file size may correspond to the software object size such as a database or may correspond to the number of outstanding requests as in case of some queuing systems.

Once file attributes are mapped to software objects' attributes this same modeling-based attributes mapping can be repeated to map attributes to other software objects that use already mapped software objects. For example, if a web Uniform Resource Locator (URL) is served by an Enterprise JavaBeans (EJB) deployed on an application server and that EJB uses a database, we can infer that if the last write to a file storing database data happened at time X then the last web request to a given URL that resulted in the database write operation happened a little earlier than time X. Galapagos may be used to discover mappings between software objects such as URL-to-EJB-to-DB-to-file and to map file attributes across software components.

At 110, the method may be possibly repeated and more information inferred based on the changes of attributes over time. The steps from 102 to 108 may be repeated to refine the findings of step 108. For example, one can monitor the write time changes of a file and infer the frequency of arrival of the related requests to a web URL several layers of abstraction above.

In one embodiment, steps 102, 104 and 106 may be performed on the actual system that is in operation or the information may be extracted from system backups or the like.

Figure 2:
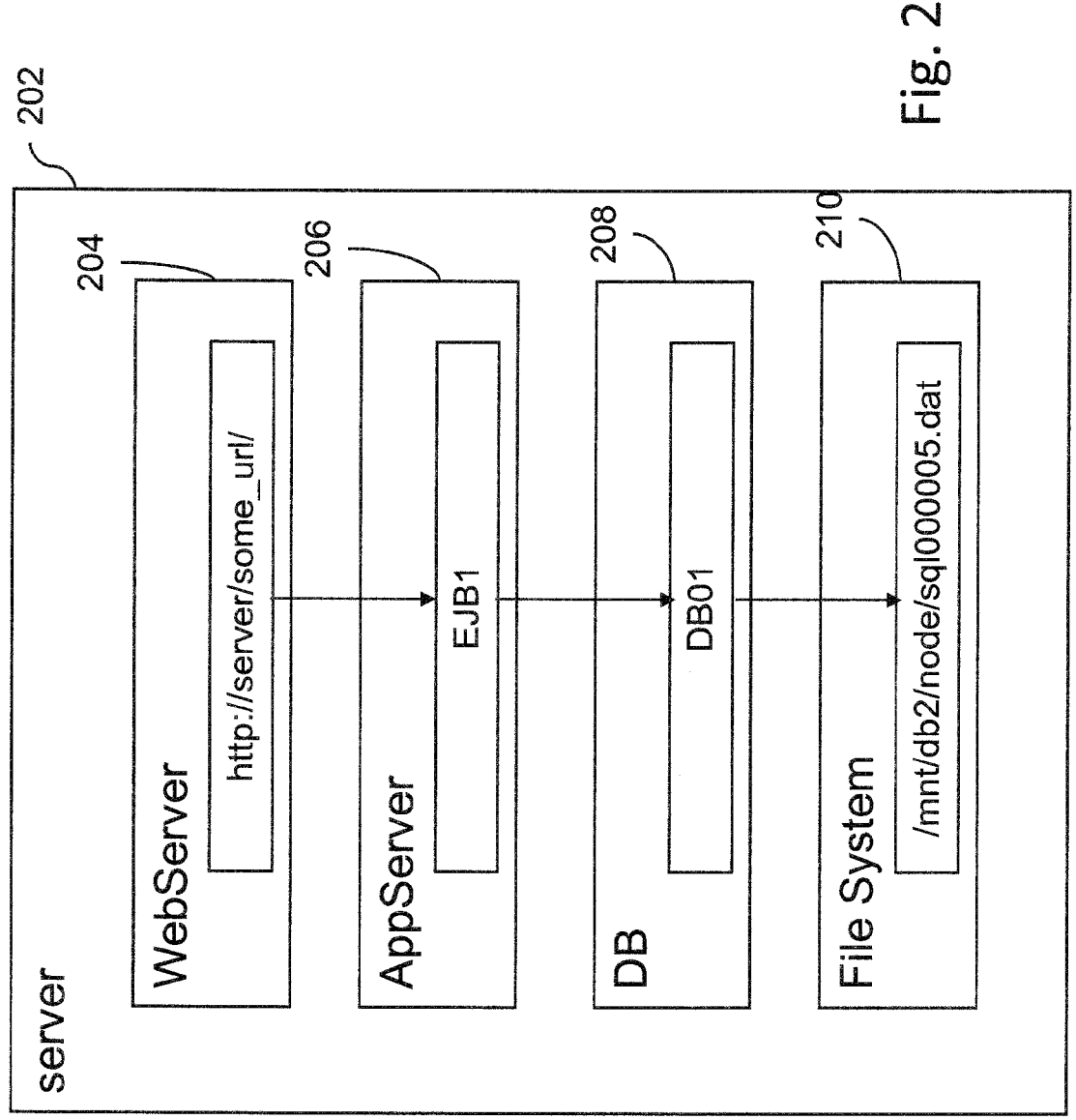
FIG. 2 is a system architecture diagram illustrating example functional or logical components of the present disclosure in one embodiment.

FIG. 2 is a system architecture diagram illustrating example functional or logical components of the present disclosure in one embodiment. A computer system may include a server 202 and various other specific servers such as a web server 204 that services web requests, one or more application servers 206 that serves one or more applications, a database server or system 208 that provides database functionalities, and a file system 210 for providing file system functionalities. The server system 202 may be running the methods described above to discover and analyze the attributes of files and objects associated with the web server 204, application server 206, database system 208 and file system 210.

While the above description referred to software installation, the method of the present disclosure may also contemplate determining characteristics about data objects that are created by firmware or even hardware. For example, objects created by hardware or firmware or the like may be analyzed similarly to determine the usage of that hardware, firmware or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
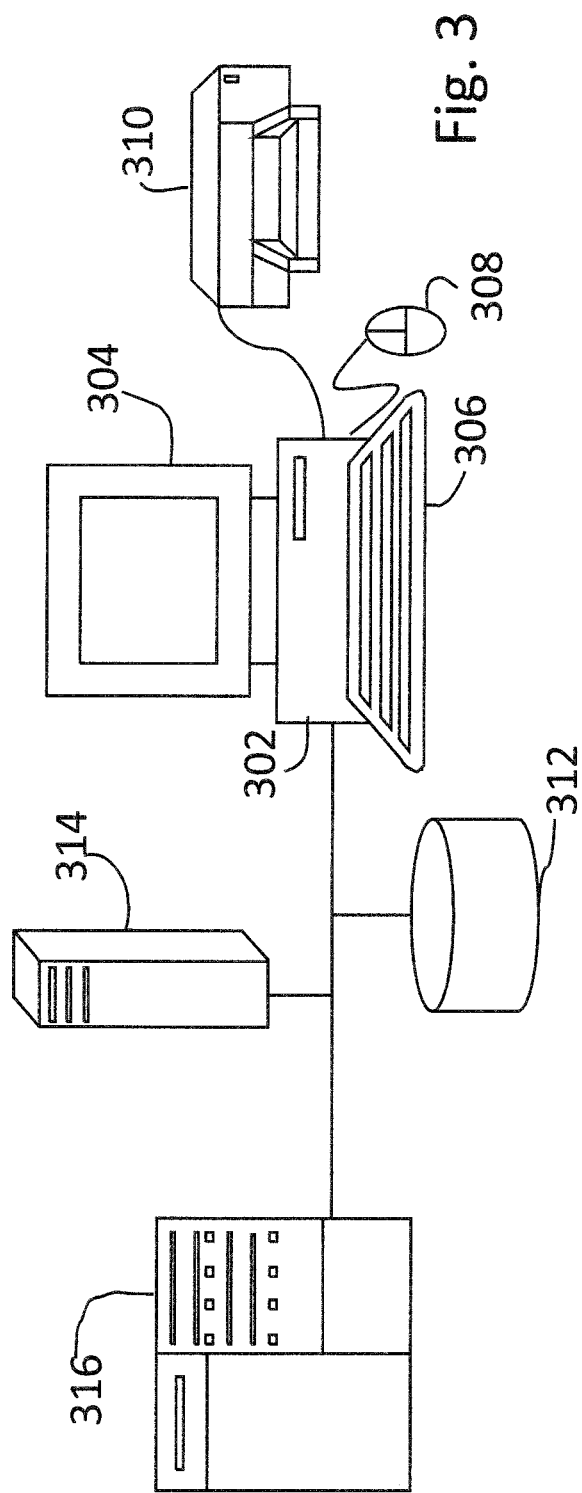
FIG. 3 shows an example of a computer system which may carry out the system and method of the present disclosure.

Referring now to FIG. 3, the systems and methodologies of the present disclosure may be carried out or executed in a computer system 302 that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 302 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 304 for presenting output displays and providing a display through which the user may input data and interact with the processing system, for instance, in cooperation with input devices such as the keyboard 306 and mouse device 308 or pointing device. The computer processing system may be also connected or coupled to one or more peripheral devices such as the printer 310, scanner (not shown), speaker, and any other devices, directly or via remote connections. The computer processing system may be connected or coupled to one or more other processing systems such as a server 310, other remote computer processing system 314, network storage devices 312, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 302, 314, 316), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for deriving software use and software data object characteristics, comprising:
   discovering automatically by a computer process one or more locations on one or more computer storage devices of a computer system where one or more configuration and data files associated with computer software components are stored;
   obtaining automatically by the computer process one or more attributes associated with said one or more computer software components by issuing one or more of commands of the computer system on the discovered one or more locations;

issuing one or more software-specific commands provided by said one or more computer software components to determine one or more data objects created on a memory device and used by said computer software components, the data objects comprising one or more of database tablespace, a message queue, a lock, or an inter-communication pipe, or combinations thereof;

collecting one or more related information associated with said one or more software computer components resulting from issuing one or more software-specific commands, the related information comprising at least said determined one or more data objects;

mapping the one or more attributes to the one or more data objects; and determining frequency and recency of the software use based on the mapping without needing to open a file associated with said one or more software computer components and without needing said one or more software computer components generate a log.

2. The method of claim 1, wherein said one or more computer software components further include one or more related files of the computer software components.

3. The method of claim 2, wherein said one or more locations are represented as computer file directories and files.

4. The method of claim 3, wherein said one or more attributes include attributes of said computer file directories and files.

5. The method of claim 1, wherein said one or more related information include information associated with another software component using said one or more computer software components, wherein frequency and recency of said another software component are discovered via said the mapped attributes of the data objects associated with said one or more computer software components.

6. The method of claim 1, further including repeating the steps of claim 1.

7. The method of claim 1, wherein the steps of determining, obtaining and issuing are performed on an operational computer system.

8. The method of claim 1, wherein the steps of determining, obtaining and issuing are performed on a backup of a computer system.

9. The method of claim 1, wherein the computer software components are web server components and the issued software-specific commands include web server commands.

10. The method of claim 1, wherein the computer software components are database server components and the issued software-specific commands include database server commands.

11. A system for deriving software use and software data object characteristics, comprising:

a processor;

a storage device; and a module operable to execute on the processor and automatically discover one or more locations on one or more computer storage devices of a computer system where one or more configuration and data files associated with computer software components are stored, the module further operable to automatically obtain one or more attributes associated with said one or more computer software components by issuing one or more command of the computer system on the discovered one or more locations, and issue one or more software-specific commands provided in said one or more computer software components to determine one or more data objects created on a memory device and used by said computer software components, the data objects comprising one or more of database tablespace, a message queue, a lock, or an inter-communication pipe, or combinations thereof, the module further operable to collect one or more related information associated with said one or more software computer components resulting from issuing one or more software-specific commands, the related information comprising at least said determined one or more data objects, and map the one or more attributes to the one or more data objects, the module further operable to determine frequency and recency of the software use based on the mapped one or more attributes and the one or more related information without needing to open a file associated with said one or more software computer components and without needing said one or more software computer components generate a log.

12. The system of claim 11, wherein said one or more computer software components further include one or more related files of the computer software components.

13. The system of claim 12, wherein said one or more locations are represented as computer file directories and files.

14. The system of claim 13, wherein said one or more attributes include attributes of said computer file directories and files.

15. The system of claim 11, wherein said one or more related information include information associated with another software component using said one or more computer software components, wherein frequency and recency of said another software component is discovered via said the mapped attributes of the data objects associated with said one or more computer software components.

16. A program storage device readable by a machine, tangibly embodying a program of instructions executable by the machine to perform a method of deriving software use and software data object characteristics, comprising:

discovering automatically by a computer process one or more locations on one or more computer storage devices of a computer system where one or more configuration and data files associated with computer software components are stored;

obtaining automatically by the computer process one or more attributes associated with said one or more computer software components by issuing one or more of commands of the computer system on the discovered one or more locations;

issuing one or more software-specific commands provided by said one or more computer software components to determine one or more data objects created on a memory device and used by said computer software components, the data objects comprising one or more of database tablespace, a message queue, a lock, or an inter-communication pipe, or combinations thereof;

collecting one or more related information associated with said one or more software computer components resulting from issuing one or more software-specific commands, the related information comprising at least said determined one or more data objects;

mapping the one or more attributes to the one or more data objects; and determining frequency and recency of the software use based on the mapping without needing to open a file associated with said one or more software computer components and without needing said one or more software computer components generate a log.

17. The program storage device of claim 16, wherein said one or more computer software components further include one or more related files of the computer software components.

18. The program storage device of claim 17, wherein said one or more locations are represented as computer file directories and files.

19. The program storage device of claim 18, wherein said one or more attributes include attributes of said computer file directories and files.

* * * * *